United States Patent
Beigi et al.

(10) Patent No.: US 6,345,252 B1
(45) Date of Patent: Feb. 5, 2002

(54) METHODS AND APPARATUS FOR RETRIEVING AUDIO INFORMATION USING CONTENT AND SPEAKER INFORMATION

(75) Inventors: Homayoon Sadr Mohammad Beigi, Yorktown Heights; Alain Charles Louis Tritschler, New York; Mahesh Viswanathan, Yorktown Heights, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/288,724

(22) Filed: Apr. 9, 1999

(51) Int. Cl.[7] ................................ G10L 15/22
(52) U.S. Cl. .................. 704/272; 704/275; 704/500; 704/251
(58) Field of Search ................. 704/231, 250, 704/238, 236, 251, 255, 260, 200, 270, 272, 275

(56) References Cited

U.S. PATENT DOCUMENTS 6,185,527 B1 * 2/2001 Petkovic et al. ............ 704/231

OTHER PUBLICATIONS

Proceedings of the Speech Recognition Worshop. C. Neti et al., "Audio Visual Speaker Recognition for video Broadcast News" 1999.*
ICASSP–97. 1997 IEEE International Conference on Acoustics, Speech and Signal Processing. Roy et al., Speaker Identification based Text to Audio Alignment for audio Retrieval System, Apr. 1997.*
ICIP 98. Proceedings. Iternational Conference on Image Processing, 1998, Tsekeridou et al. "Speaker dependent videi indexing based on audio–visual interaction". Pp. 358–362 vol. 1. Oct. 1998.*
1996 IEEE Multimedia. Wold et al. "Content based classification, search, and retrieval of audio" pp. 27–36. Fall 1996.*
S. Dharanipragada et al., "Experimental Results in Audio Indexing," Proc. ARPA SLT Workshop, (Feb. 1996).
L. Polymenakos et al., "Transcription of Braodcast News—Some Recent Inprovements to IBM's LVCSR System," Proc. ARPA SLT Workshop, (Feb. 1996).
R. Bakis, "Transcription of Broadcast News Shows with the IBM Large Vocabulary Speech Recognition System," Proc. ICASSP98, Seattle, WA (1998).

(List continued on next page.)

*Primary Examiner*—Richemond Dorvil
(74) *Attorney, Agent, or Firm*—Ryan, Mason & Lewis, LLP; Paul J. Otterstedt, Esq.

(57) ABSTRACT

Methods and apparatus are provided for retrieving audio information based on the audio content as well as the identity of the speaker. The results of content and speaker-based audio information retrieval methods are combined to provide references to audio information (and indirectly to video). A query search system retrieves information responsive to a textual query containing a text string (one or more key words), and the identity of a given speaker. An indexing system transcribes and indexes the audio information to create time-stamped content index file(s) and speaker index file(s). An audio retrieval system uses the generated content and speaker indexes to perform query-document matching based on the audio content and the speaker identity. Documents satisfying the user-specified content and speaker constraints are identified by comparing the start and end times of the document segments in both the content and speaker domains. Documents satisfying the user-specified content and speaker constraints are assigned a combined score that can be used in accordance with the present invention to rank-order the identified documents returned to the user, with the best-matched segments at the top of the list.

33 Claims, 4 Drawing Sheets

OTHER PUBLICATIONS

H. Beigi et al., "A Distance Measure Between Collections of Distributions and its Application to Speaker Recognition," Proc. ICASSP98, Seattle, WA (1998).

S. Chen, "Speaker, Environment and Channel Change Detection and Clustering via the Bayesian Information Criterion," Proceedings of the Speech Recognition Workshop (1998).

S. Chen et al., "Clustering via the Bayesian Information Criterion with Applications in Speech Recognition," Proc. ICASSP98, Seattle, WA (1998).

S. Chen et al., "IBM's LVCSR System for Transcription of Broadcast News Used in the 1997 Hub4 English Evaluation," Proceedings of the Speech Recognition Workshop (1998).

S. Dharanipragada et al., "A Fast Vocabulary Independent Algorithm for Spotting Words in Speech," Proc. ICASSP98, Seattle, WA (1998).

J. Navratil et al., "An Efficient Phonotactic–Acoustic system for Language Identification," Proc. ICASSP98, Seattle, WA (1998).

G. N. Ramaswamy et al., "Compression of Acoustic Features for Speech Recognition in Network Environments," Proc. ICASSP98, Seattle, WA (1998).

S. Chen et al., "Recent Improvements to IBM's Speech Recognition System for Automatic Transcription of Broadcast News," Proceedings of the Speech Recognition Workshop (1999).

S. Dharanipragada et al., "Story Segmentation and Topic Detection in the Broadcast News Domain," Proceedings of the Speech Recognition Workshop (1999).

C. Neti et al., "Audio–Visual Speaker Recognition for Video Broadcast News," Proceedings of the Speech Recognition Workshop (1999).

* cited by examiner

DOCUMENT DATABASE 210

| DOCUMENT CHUNK ID | START TIME | END TIME | DOCUMENT LENGTH | DOCUMENT CHUNK INDEX POINTER |
|---|---|---|---|---|
| | | | | |
| | | | | |
| | | | | |
| | | | | |

FIG. 2B
DOCUMENT CHUNK INDEX
(DOCUMENT CHUNK N1) 240

| WORD STRING | START TIME |
|---|---|
| 1 | $t_1$ |
| 2 | $t_2$ |
| ... | ... |
| N | $t_N$ |

FIG. 2C
UNIGRAM FILE
(TERM FREQUENCY) 260

| WORD STRING | NUMBER OF OCCURRENCES IN DOCUMENT |
|---|---|
| 1 | $t_1$ |
| 2 | $t_2$ |
| ... | ... |
| N | $t_N$ |

FIG. 2D
INVERSE DOCUMENT INDEX 275

| VOCABULARY ID | WORD STRING | IDF | DOCUMENT LIST |
|---|---|---|---|
|  |  |  |  |
|  |  |  |  |
|  |  |  |  |
|  |  |  |  |

SPEAKER INDEX FILE(S) 300

| | SEGMENT NUMBER | SPEAKER LABEL | AUDIO IDENTIFIER | START TIME | END TIME | SCORE |
|---|---|---|---|---|---|---|
| 305 | 1 | SPEAKER 1 | MEDIA 1 | $T_A$ | $T_B$ | $S_{10}$ |
| 306 | 2 | SPEAKER 1 | MEDIA 6 | $T_K$ | $T_L$ | $S_{11}$ |
| 307 | ... | ... | ... | ... | ... | ... |
| 308 | N | SPEAKER 1 | MEDIA 3 | $T_E$ | $T_F$ | $S_{12}$ |
| 309 | 1 | SPEAKER N | MEDIA 4 | $T_G$ | $T_H$ | $S_{20}$ |
| 310 | 2 | SPEAKER N | MEDIA 5 | $T_I$ | $T_J$ | $S_{21}$ |
| 311 | ... | ... | ... | ... | ... | ... |
| 312 | N | SPEAKER N | MEDIA 7 | $T_M$ | $T_N$ | $S_{22}$ |

METHODS AND APPARATUS FOR RETRIEVING AUDIO INFORMATION USING CONTENT AND SPEAKER INFORMATION

FIELD OF THE INVENTION

The present invention relates generally to information retrieval systems and, more particularly, to methods and apparatus for retrieving multimedia information, such as audio and video information, satisfying user-specified criteria from a database of multimedia files.

BACKGROUND OF THE INVENTION

Information retrieval systems have focused primarily on retrieving text documents from large collections of text. The basic principles of text retrieval are well established and have been well documented. See, for example, G. Salton, Automatic Text Processing, Addison-Wesley, 1989. An index is a mechanism that matches descriptions of documents with descriptions of queries. The indexing phase describes documents as a list of words or phrases, and the retrieval phase describes the query as a list of words or phrases. A document (or a portion thereof) is retrieved when the document description matches the description of the query.

Data retrieval models required for multimedia objects, such as audio and video files, are quite different from those required for text documents. There is little consensus on a standard set of features for indexing such multimedia information. One approach for indexing an audio database is to use certain audio cues, such as applause, music or speech. Similarly, an approach for indexing video information is to use key frames, or shot changes. For audio and video information that is predominantly speech, such as audio and video information derived from broadcast sources, the corresponding text may be generated using a speech recognition system and the transcribed text can be used for indexing the associated audio (and video).

Currently, audio information retrieval systems consist of two components, namely, a speech recognition system to transcribe the audio information into text for indexing, and a text-based information retrieval system. Speech recognition systems are typically guided by three components, namely, a vocabulary, a language model and a set of pronunciations for each word in the vocabulary. A vocabulary is a set of words that is used by the speech recognizer to translate speech to text. As part of the decoding process, the recognizer matches the acoustics from the speech input to words in the vocabulary. Therefore, the vocabulary defines the words that can be transcribed. If a word that is not in the vocabulary is to be recognized, the unrecognized word must first be added to the vocabulary.

A language model is a domain-specific database of sequences of words in the vocabulary. A set of probabilities of the words occurring in a specific order is also required. The output of the speech recognizer will be biased towards the high probability word sequences when the language model is operative. Thus, correct decoding is a function of whether the user speaks a sequence of words that has a high probability within the language model. Thus, when the user speaks an unusual sequence of words, the decoder performance will degrade. Word recognition is based entirely on its pronunciation, i.e., the phonetic representation of the word. For best accuracy, domain-specific language models must be used. The creation of such a language model requires explicit transcripts of the text along with the audio.

Text-based information retrieval systems typically work in two phases. The first phase is an off-line indexing phase, where relevant statistics about the textual documents are gathered to build an index. The second phase is an on-line searching and retrieval phase, where the index is used to perform query-document matching followed by the return of relevant documents (and additional information) to the user. During the indexing phase, the text output from the speech recognition system is processed to derive a document description that is used in the retrieval phase for rapid searching.

During the indexing process, the following operations are generally performed, in sequence: (i) tokenization, (ii) part-of-speech tagging, (iii) morphological analysis, and (iv) stop-word removal using a standard stop-word list. Tokenization detects sentence boundaries. Morphological analysis is a form of linguistic signal processing that decomposes nouns into their roots, along with a tag to indicate the plural form. Likewise, verbs are decomposed into units designating person, tense and mood, along with the root of the verb. For a general discussion of the indexing process, see, for example, S. Dharanipragada et al., "Audio-Indexing for Broadcast News," in Proc. SDR97, 1997.incorporated by reference herein.

While such content-based audio information retrieval systems allow a user to retrieve audio files containing one or more key words specified in a user-defined query, current audio information retrieval systems do not allow a user to selectively retrieve relevant audio files based on the identity of the speaker. Thus, a need exists for a method and apparatus that retrieves audio information based on the audio content as well as the identity of the speaker.

SUMMARY OF THE INVENTION

Generally, a method and apparatus are disclosed for retrieving audio information based on the audio content as well as the identity of the speaker. The disclosed audio retrieval system combines the results of content and speaker-based audio information retrieval methods to provide references to audio information (and indirectly to video).

According to one aspect of the invention, a query search system retrieves information responsive to a textual query containing a text string (one or more key words), and the identity of a given speaker. The constraints of the user-defined query are compared to an indexed audio or video database (or both) and relevant audio/video segments containing the specified words spoken by the given speaker are retrieved for presentation to the user.

The disclosed audio retrieval system consists of two primary components. An indexing system transcribes and indexes the audio information to create time-stamped content index file(s) and speaker index file(s). An audio retrieval system uses the generated content and speaker indexes to perform query-document matching based on the audio content and the speaker identity. Relevant documents (and possibly additional information) are returned to the user.

Documents satisfying the user-specified content and speaker constraints are identified by comparing the start and end times of the document segments in both the content and speaker domains. According to another aspect of the invention, the extent of the overlap between the content and speaker domains is considered. Those document segments that overlap more are weighted more heavily. Generally, documents satisfying the user-specified content and speaker constraints are assigned a combined score computed using the following equation:

combined score=(ranked document score+(lambda*speaker segment score))*overlap factor The ranked document score ranks the content-based information retrieval, for example, using the Okapi equation. The speaker segment score is a distance measure indicating the proximity between the speaker segment and the enrolled speaker information and can be calculated during the indexing phase. Lambda is a variable that records the degree of confidence in the speaker identity process, and is a number between zero and one.

Generally, the overlap factor penalizes segments that do not overlap completely, and is a number between zero and one. The combined score can be used in accordance with the present invention to rank-order the identified documents returned to the user, with the best-matched segments at the top of the list.

A more complete understanding of the present invention, as well as further features and advantages of the present invention, will be obtained by reference to the following detailed description and drawings.

BRIEF DESCRIPTION OF THE DRAWINGS

FIG. 2B is a table from the document chunk index of the content index file(s) of FIG. 1;

FIG. 2C is a table from the unigram file (term frequency) of the content index file(s) of FIG. 1;

FIG. 2D is a table from the an inverse document index, (IDF) of the content index file(s) of FIG. 1;

DETAILED DESCRIPTION OF PREFERRED EMBODIMENTS

Figures 1, 2A:
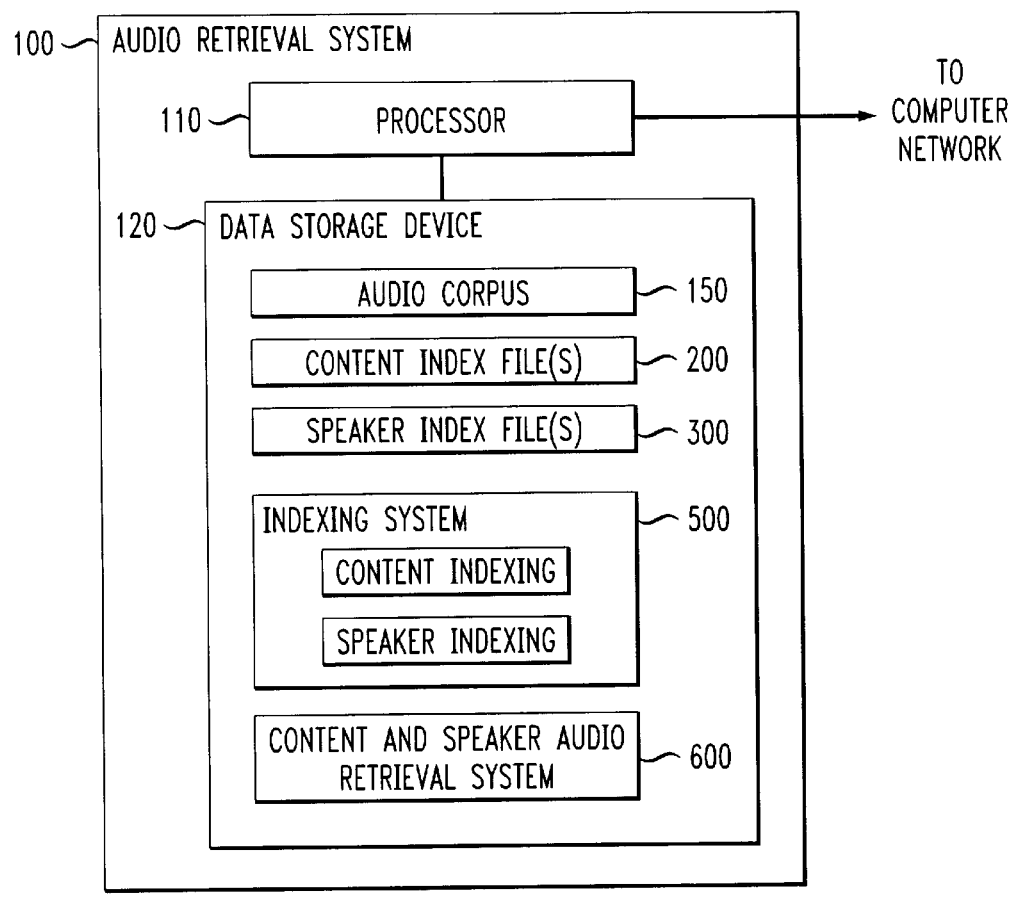
FIG. 1 is a block diagram of an audio retrieval system according to the present invention.
FIG. 2A is a table from the document database of the content index file(s) of FIG. 1.

An audio retrieval system 100 according to the present invention is shown in FIG. 1. As discussed further below, the audio retrieval system 100 combines the results of two distinct methods of searching for audio material to provide references to audio information (and indirectly to video) based on the audio content as well as the identity of the speaker. Specifically, the results of a user-specified content-based retrieval, such as the results of a Web search engine, are combined in accordance with the present invention with the results of a speaker-based retrieval.

The present invention allows a query search system to retrieve information responsive to a textual query containing an additional constraint, namely, the identity of a given speaker. Thus, a user query includes a text string containing one or more key words, and the identity of a given speaker. The present invention compares the constraints of the user-defined query to an indexed audio and/or video database and retrieves relevant audio/video segments containing the specified words spoken by the given speaker.

As shown in FIG. 1, the audio retrieval system 100 of the present invention consists of two primary components, namely, an indexing system 500 that transcribes and indexes the audio information, and an audio retrieval system 600. As discussed further below, the indexing system 500 processes the text output from a speech recognition system during the indexing phase to perform content indexing and speaker indexing. During the retrieval phase, the content and speaker audio retrieval system 600 uses the content and speaker indexes generated during the indexing phase to perform query-document matching based on the audio content and speaker identity and to return relevant documents (and possibly additional information) to the user.

As discussed below, the speech recognition system produces transcripts with time-alignments for each word in the transcript. Unlike a conventional information retrieval scenario, there are no distinct documents in the transcripts and therefore one has to be artificially generated. In the illustrative embodiment, for the content-based index, the transcribed text corresponding to each audio or video file is automatically divided into overlapping segments of a fixed number of words, such as 100 words, and each segment is treated as a separate document. In an alternative implementation, topic identification schemes are used to segment the files into topics. Likewise, for the speaker-based index, the audio or video file is automatically divided into individual segments associated with a given speaker. Thus, a new segment is created each time a new speaker speaks.

The present invention establishes the best portions of the audio as determined by the content-based retrieval and the speaker-based retrieval. It is noted that the size of a segment in the content based index is about the time it takes to speak 100 words, which is approximately 30 seconds. The length of a segment in the speaker-based index, however, is variable, being a function of the speaker change detector. Thus, the segment length cannot be predicted. Thus, according to a feature of the present invention, the start and end times of the segments in both domains are compared.

According to a further feature of the present invention, the extent of the overlap between the content and speaker domains is considered. Those documents that overlap more are weighted more heavily. Generally, as discussed further below in conjunction with FIG. 6, the combined score is computed using the following equation:

combined score=(ranked document score+(lambda*speaker segment score))*overlap factor The ranked document score ranks the content-based information retrieval, for example, using the Okapi equation, discussed below. The ranked document score is a function of the query terms, and is thus calculated at retrieval time. The speaker segment score is a distance measure indicating the proximity between the speaker segment and the enrolled speaker information and can be calculated during the indexing phase. Lambda is a variable that records the degree of confidence in the speaker identity process, and is a number between zero and one. The overlap factor penalizes segments that do not overlap completely, and is a number between zero and one. The combined score can be used to rank-order the identified documents returned to the user, with the best-matched segments at the top of the list.

FIG. 1 is a block diagram showing the architecture of an illustrative audio retrieval system 100 in accordance with the present invention. The audio retrieval system 100 may be embodied as a general purpose computing system, such as the general purpose computing system shown in FIG. 1. The audio retrieval system 100 includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute.

The data storage device 120 preferably includes an audio corpus database 150 for storing one or more audio or video files (or both) that can be indexed and retrieved in accordance with the present invention. In addition, the data storage device 120 includes one or more content index file(s) 200 and one or more speaker index file(s) 300, discussed below in conjunction with FIGS. 2 and 3, respectively. Generally, as discussed below in conjunction with FIGS. 2A through 2D, the content index file(s) 200 includes a document database 210 (FIG. 2A), a document chunk index 240 (FIG. 2B), a unigram file (term frequency) 260 (FIG. 2C) and an inverse document index (IDF) 275 (FIG. 2D). The content index file(s) 200 are generated in conjunction with a speech recognition system during an indexing phase and describes the audio (or video) documents as a list of words or phrases, together with additional indexing information. The speaker index file(s) 300 is generated in conjunction with a speaker identification system during the indexing phase and provides a speaker label for each segment of an audio file. Thereafter, during the retrieval phase, the content index file(s) 200 and speaker index file(s) 300 are accessed and a document is retrieved if the document description in the content index file(s) 200 matches the description of the user-specified query and the speaker identity indicated by the speaker label in the speaker index file(s) 300 matches the designated speaker identity.

In addition, the data storage device 120 includes the program code necessary to configure the processor 110 as an indexing system 500, discussed further below in conjunction with FIG. 5, and a content and speaker audio retrieval system 600, discussed further below in conjunction with FIG. 6. As previously indicated, the indexing system 500 analyzes one or more audio files in the audio corpus database 150 and produces the corresponding content index file(s) 200 and speaker index file(s) 300. The content and speaker audio retrieval system 600 accesses the content index file(s) 200 and speaker index file(s) 300 in response to a user-specified query to perform query-document matching based on the audio content and speaker identity and to return relevant documents to the user.

INDEX FILES

As previously indicated, the audio sample is initially transcribed, for example, using a speech recognition system, to produce a textual version of the audio information. Thereafter, the indexing system 500 analyzes the textual version of the audio file(s) to produce the corresponding content index file(s) 200 and speaker index file(s) 300.

As previously indicated, the content index file(s) 200 includes a document database 210 (FIG. 2A), a document chunk index 240 (FIG. 2B), a unigram file (term frequency) 260 (FIG. 2C) and an inverse document index (IDF) 275 (FIG. 2D). Generally, the content index files 200 store information describing the audio (or video) documents as a list of words or phrases, together with additional indexing information. In the illustrative embodiment, the content index file(s) 200 records, among other things, statistics required by the Okapi equation.

The document database 210 (FIG. 2A) maintains a plurality of records, such as records 211 through 214, each associated with a different 100 word document chunk in the illustrative embodiment. In one implementation, there is a 50 word overlap between documents. For each document chunk identified in field 220, the document database 210 indicates the start and end time of the chunk in fields 222 and 224, respectively, as well as the document length in field 226. Finally, for each document chunk, the document database 210 provides a pointer to a corresponding document chunk index 240, that indexes the document chunk. Although documents have a fixed length of 100 words in the illustrative embodiment, the length in bytes can vary. As discussed below, the document length (in bytes) is used to normalize the scoring of an information retrieval.

The document chunk index 240 (FIG. 2B) maintains a plurality of records, such as records 241 through 244, each associated with a different word in the corresponding document chunk. Thus, in the illustrative implementation, there are 100 entries in each document chunk index 240. For each word string (from the document chunk) identified in field 250, the document chunk index 240 indicates the start time of the word in field 255.

A unigram file (term frequency) 260 (FIG. 2C) is associated with each document, and indicates the number of times each word occurs in the document. The unigram file 260 maintains a plurality of records, such as records 261 through 264, each associated with a different word appearing in the document. For each word string identified in field 265, the unigram file 260 indicates the number of times the word appears in the document in field 270.

The inverse document index 275 (FIG. 2D) indicates the number of times each word appears in the collection of documents (the audio corpus), and is used to rank the relevance of the current document amongst all documents in which the word occurs. The inverse document index 275 maintains a plurality of records, such as records 276 through 279, each associated with a different word in the vocabulary. For each word identified by the vocabulary identifier in field 280, the inverse document index 275 indicates the word string in field 285, the inverse document frequency (IDF) in field 290 and a list of the documents in which the word appears in field 295. The list of documents in field 295 permits a determination of whether the word appears in any documents without actually searching.

Figures 3, 4:
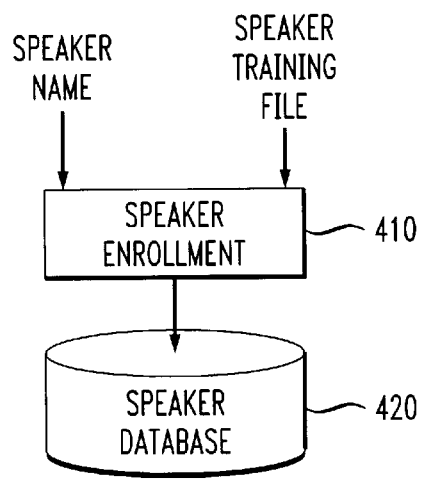
FIG. 3 is a table from the speaker index file(s) of FIG. 1.
FIG. 4 illustrates a representative speaker enrollment process in accordance with the present invention.

As previously indicated, the speaker index file(s) 300, shown in FIG. 3, provides a speaker label for each segment of an audio file. The speaker index file(s) 300 maintains a plurality of records, such as records 305 through 312, each associated with a different segment of an audio file. Each segment of speech is associated with a different speaker. For each segment identified in field 325, the speaker index file(s) 300 identifies the corresponding speaker in field 330, and the corresponding audio or video file containing the segment in field 335. In addition, the speaker index file(s) 300 also indicates the start and end time of the segment (as offsets from the start of the file) in fields 340 and 345, respectively. The speaker index file(s) 300 indicates a score (distance measure) in field 350 indicating the proximity between the speaker segment and the enrolled speaker information, as discussed below in conjunction with FIG. 5.

SPEAKER REGISTRATION PROCESS

FIG. 4 illustrates a known process used to register or enroll speakers. As shown in FIG. 4, for each registered speaker, the name of the speaker is provided to a speaker enrollment process 410, together with a speaker training file, such as a pulse-code modulated (PCM) file. The speaker enrollment process 410 analyzes the speaker training file, and creates an entry for each speaker in a speaker database 420. The process of adding speaker's voice samples to the speaker database 420 is called enrollment. The enrollment process is offline and the audio indexing system assumes such a database exists for all speakers of interest. About a minute's worth of audio is generally required from each speaker from multiple channels and microphones encompassing multiple acoustic conditions. The training data or database of enrolled speakers is stored using a hierarchical structure so that accessing the models is optimized for efficient recognition and retrieval.

INDEXING PROCESS

Figure 5:
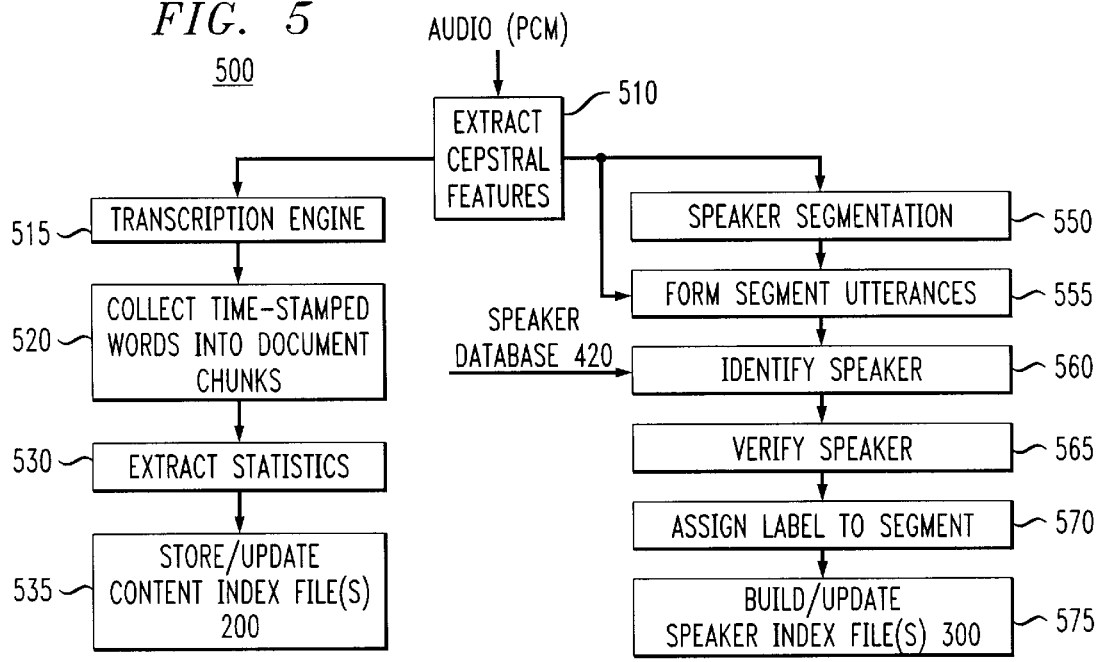
FIG. 5 is a flow chart describing an exemplary indexing system process, performed by the audio retrieval system of FIG. 1.

As previously indicated, during the indexing phase, the indexing system 500, shown in FIG. 5, processes the text output from the speech recognition system to perform content indexing and speaker indexing. As shown in FIG. 5, the content indexing and speaker indexing are implemented along two parallel processing branches, with content indexing being performed in steps 510 through 535, and speaker indexing being performed during steps 510 and 550 through 575. It is noted, however, that the content indexing and speaker indexing can be performed sequentially, as would be apparent to a person of ordinary skill in the art.

As an initial step for both content indexing and speaker indexing, capstral features are extracted from the audio files during step 510, in a known manner. Generally, step 510 changes the domain of the audio files to the frequency domain, reduces the dynamic range and performs an inverse transform to return the signal to the time domain.

Content-Indexing

The audio information is then applied to a transcription engine, such as the ViaVoice™ speech recognition system, commercially available from IBM Corporation of Armonk, N.Y., during step 515 to produce a transcribed file of time-stamped words. Thereafter, the time-stamped words are collected into document chunks of a fixed length, such as 100 words in the illustrative embodiment, during step 520.

The statistics required for the content index file(s) 200 are extracted from the audio files during step 530. As discussed above, the indexing operations includes: (i) tokenization, (ii) part-of-speech tagging, (iii) morphological analysis, and (iv) stop-word removal using a standard stop-word list. Tokenization detects sentence boundaries. Morphological analysis is a form of linguistic signal processing that decomposes nouns into their roots, along with a tag to indicate the plural form. Likewise, verbs are decomposed into units designating person, tense and mood, along with the root of the verb.

During step 530, the indexing system 500 obtains the statistics required by the Okapi equation. For each word identified in the audio field, the following information is obtained: the term frequency (number of times the word appears in a given document); the inverse document frequency (IDF) (indicating the number of documents in which the word occurs); the document length (for normalization) and a set of chain linked pointers to each document containing the word (an inverted index).

The information obtained during step 530 is stored in a content index file(s) 200 during step 535, or if a content index file(s) 200 already exists, the information is updated.

Speaker-Indexing

As discussed further below, the speaker-based information retrieval system consists of two components: (1) an acoustic-change detection system (often referred to as speaker segmentation), and (2) a speaker-independent, language-independent, text-independent speaker recognition system. To automate the speaker identification process, the boundaries (turns) between non-homogeneous speech portions must be detected during step 550. Each homogeneous segment should correspond to the speech of a single speaker. Once delineated, each segment can be classified as having been spoken by a particular speaker (assuming the segment meets the minimum segment length requirement required for speaker recognition system).

The model-selection criterion used to segment the speech during step 550 of the illustrative embodiment, is the well-known Bayesian Information Criterion (BIC). The input audio stream can be modeled as a Gaussian process on the cepstral space. BIC is a maximum likelihood approach to detect (speaker) turns of a Gaussian process. The problem of model identification is to choose one from among a set of candidate models to describe a given data set. It assumes the frames (10 ms) derived from the input audio signal are independent and result from a single-gaussian process. In order to detect if there is a speech change in a window of N feature vectors after the frame i, $1 \leq i < N$, two models are built. The first model represents the entire window by one Gaussian, characterized by its mean and fill covariance $\{\mu, \Sigma\}$. The second model represents the first part of the window, up to frame i, with a first Gaussian $\{\mu_1, \Sigma_1\}$, and the second part of the window with another Gaussian $\{\mu_2, \Sigma_2\}$. The criterion is then expressed as: $\Delta BIC(i) = -R(i) + \lambda P$, where $$R(i) = \frac{N}{2}\log|\Sigma| - \frac{N_1}{2}\log|\Sigma_1| - \frac{N_2}{2}\log|\Sigma_2|$$

and $$P = \frac{1}{2}\left(d + \frac{d(d+1)}{2}\right)\log N$$

is the penalty associated to the window, $N_1 = i$ is the number of frames of the first part of the window, and $N_2 = (N-i)$ is the number of frames of the second part; d is the dimension of the frames. Therefore, P reflects the complexity of the models, as $$d + \frac{d(d+1)}{2}$$

is the number of parameters used to represent the Gaussians.

$\Delta BIC < 0$ implies, taking the penalty into account, that the model splitting the window into two Gaussians is more likely than the model representing the entire window with only a single Gaussian. The BIC therefore behaves like a thresholded-likelihood ratio criterion, where the threshold is not empirically tuned but has a theoretical foundation. This criterion is robust and requires no prior training.

In the illustrative implementation, the BIC algorithm has been implemented to make it fast without impairing the accuracy. The feature vectors used are simply mel-cepstra frames using 24 dimensions. No other processing is done on these vectors. The algorithm works on a window-by-window basis, and in each window, a few frames are tested to check whether they are BIC-prescribed segment boundaries. If no segment boundary is found (positive $\Delta BIC$), then the window size is increased. Otherwise, the old window location is recorded, which also corresponds to the start of a new window (with original size).

A detailed set of steps for a BIC implementation is set forth below. The BIC computations are not performed for each frame of the window for obvious practical reasons. Instead, a frame resolution r is used, which splits the window into $M = N/r$ subsegments. Out of the resulting $(M-1)$ BIC tests, the one that leads to the most negative $\Delta BIC$ is selected. If such a negative value exists, the detection window is reset to its minimal size, and a refinement of the point detected is performed, with a better resolution. These refinement steps increase the total number of computations and impact the speed-performance of this algorithm. Hence, these should be tailored to the particular user environment, real-time or offline.

If no negative value is found, the window size is increased from $N_{i-1}$ to $N_i$ frames using the following rule" $N_i=N_{i-1}+\Delta N_i$, with $N_i$ also increasing when no change is found: $N_i-N_{i-1}=2(N_{i-1}-N_{i-2})$. This speeds up the algorithm in homogeneous segments of the speech signal. In order not to increase the error rate though, the $\Delta N_i$ has an upper bound. When the detection window gets too big, the number of BIC computations is further reduced. If more than $M_{max}$ subsegments are present, only $M_{max}-1$) BIC computations will be performed—skipping the first.

During step 555, the results of step 550 are used to analyze the features produced during step 510 and to generate segment utterances, comprised of chunks of speech by a single speaker. The segment utterances are applied during step 560 to a speaker identification system. For a discussion of a speaker identification system, see, for example, H. S. M. Beigi et al., "IBM Model-Based and Frame-By-Frame Speaker-Recognition," in Proc. of Speaker Recognition and Its Commercial and Forensic Applications, Avignon, France (1998). Generally, the speaker identification system compares the segment utterances to the speaker database 420 (FIG. 4) and finds the "closest" speaker.

The speaker identification system has two different implementations, a model-based approach and a frame-based approach with concomitant merits and demerits. The engine is both text and language independent to facilitate live audio indexing of material such as broadcast news.

Speaker Identification—The Model-Based Approach

To create a set of training models for the population of speakers in the database, a model $M_i$ for the $i^{th}$ speaker based on a sequence of M frames of speech, with the d-dimensional feature vector $\{\vec{f}_m\}_{m=1,\ldots,M}$, is computed. These models are stored in terms of their statistical parameters, such as, $\{\vec{\mu}_{i,j}, \Sigma_{i,j}, \vec{C}_{i,j}\}_{j=1,\ldots,n_i}$, consisting of the Mean vector, the Covariance matrix, and the Counts, for the case when a Gaussian distribution is selected. Each speaker, i, may end up with a model consisting of $n_i$ distributions.

Using the distance measure proposed in H. S. M. Beigi et. al, A Distance Measure Between Collections of Distributions and Its Application to Speaker Recognition,' Proc. ICASSP98}, Seattle, Wash., 1998, for comparing two such models, a hierarchical structure is created to devise a speaker recognition system with many different capabilities including speaker identification (attest a claim), speaker classification (assigning a speaker), speaker verification (second pass to confirm classification by comparing label with a "cohort" set of speakers whose characteristics match those of the labeled speaker), and speaker clustering.

The distance measure devised for speaker recognition permits computation of an acceptable distance between two models with a different number of distributions $n_i$. Comparing two speakers solely based on the parametric representation of their models obviates the need to carry the features around making the task of comparing two speakers much less computationally intensive. A short-coming of this distance measure for the recognition stage, however, is that the entire speech segment has to be used to build the model of the test individual (claimant) before computation of the comparison can begin. The frame-by-frame approach alleviates this problem.

Speaker Identification—The Frame-By-Frame Approach

Let $M_i$ be the model corresponding to the $i^{th}$ enrolled speaker. $M_i$ is entirely defined by the parameter set, $\{\vec{\mu}_{i,j}, \Sigma_{i,j}, \vec{p}_{i,j}\}_{j=1,\ldots,n_i}$, consisting of the mean vector, covariance matrix, and mixture weight for each of the $n_i$ components of speaker i's Gaussian Mixture Model (GMM). These models are created using training data consisting of a sequence of M frames of speech, with the d-dimensional feature vector, $\{\vec{f}_m\}_{m=1,\ldots,M}$, as described in the previous section. If the size of the speaker population is $N_p$, then the set of the model universe is $\{M_i\}_{i=1,\ldots,N_p}$. The fundamental goal is to find the i such that $M_i$ best explains the test data, represented as a sequence of N frames, $\{\vec{f}_n\}_{n=1,\ldots,N}$, or to make a decision that none of the models describes the data adequately. The following frame-based weighted likelihood distance measure, $d_{i,n}$, is used in making the decision:

$$d_{i,n} = -\log\left[\sum_{j=1}^{n_i} p_{i,j} p(f_n | j^{th} \text{ component of } M_i)\right],$$

where, using a Normal representation, $$p(\vec{f}_n | \cdot) = \frac{1}{(2\pi)^{d/2} |\Sigma_{i,j}|^{1/2}} e^{-\frac{1}{2}(\vec{f}_n - \vec{\mu}_{i,j})^t \Sigma_{i,j}^{-1}(\vec{f}_n - \vec{\mu}_{i,j})}$$

The total distance, $D_i$, of model $M_i$ from the test data is then taken to be the sum of all the distances over the total number of test frames.

For classification, the model with the smallest distance to that of the speech segment is chosen. By comparing the smallest distance to that of a background model, one could provide a method to indicate that none of the original models match very well. Alternatively, a voting technique may be used for computing the total distance.

For verification, a predetermined set of members that form the cohort of the labeled speaker is augmented with a variety of background models. Using this set as the model universe, the test data is verified by testing if the claimant's model has the smallest distance; otherwise, it is rejected.

This distance measure is not used in training since the frames of speech would have to retained for computing the distances between the speakers. The training is done, therefore, using the method for the model-based technique discussed above.

The index file for speaker-based retrieval is built by taking a second pass over the results of speaker classification and verification during step 565. If the speaker identification is verified during step 565, then the speaker label is assigned to the segment during step 570.

As previously indicated, each classification result is accompanied by a score indicating the distance from the original enrolled speaker model to the audio test segment, the start and end times of the segment relative to the beginning of the audio clip concerned, and a label (name of the speaker supplied during enrollment). In addition, for any given audio clip, all the segments assigned to the same (speaker) label are gathered. They are then sorted by their scores and normalized by the segment with the best score. For every new audio clip processed by the system and added to the index, all the labeled segments are again sorted and re-normalized.

This information is stored in a speaker index file(s) 300 during step 575, or if a speaker index file(s) 300 already exists, the information is updated.

RETRIEVAL PROCESS

Figure 6:
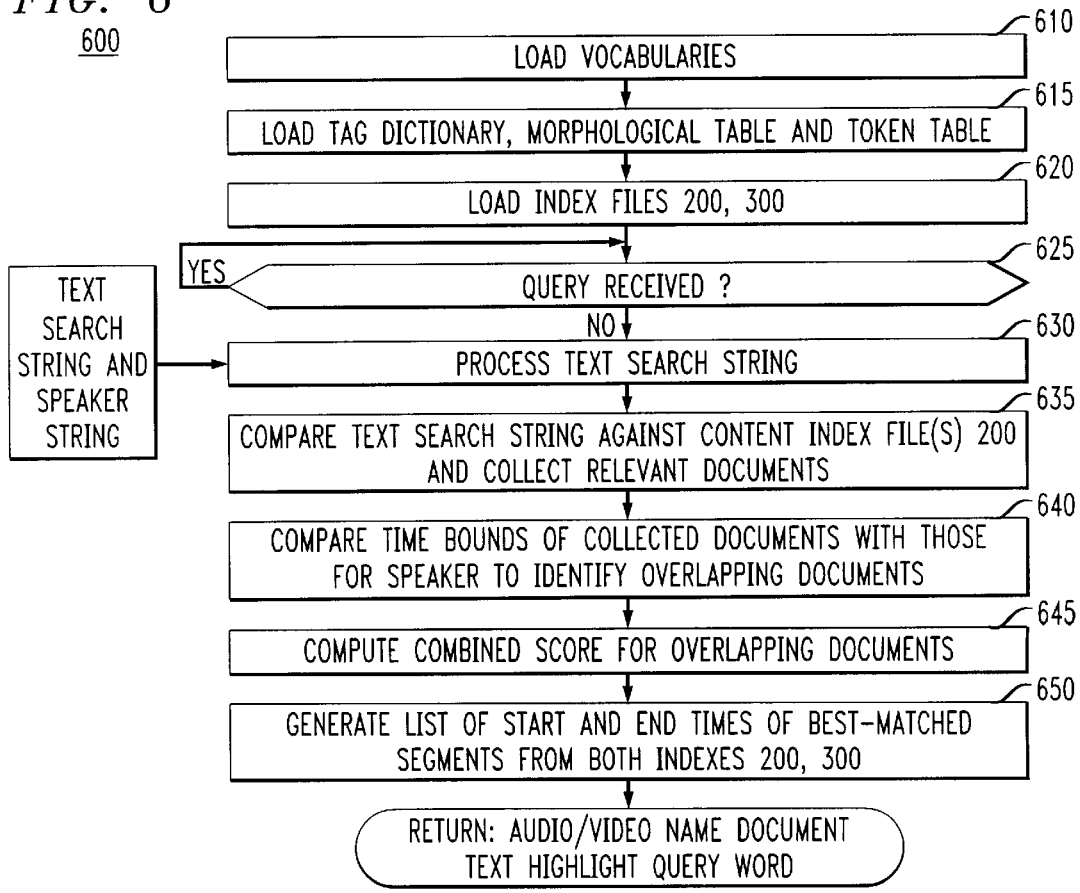
FIG. 6 is a flow chart describing an exemplary content and speaker audio retrieval system process, performed by the audio retrieval system of FIG. 1.

As previously indicated, during the retrieval phase, the content and speaker audio retrieval system 600, shown in FIG. 6, uses the content and speaker indexes generated during the indexing phase to perform query-document matching based on the audio content and speaker identity and to return relevant documents (and possibly additional information) to the user. Generally, retrieval can be performed using two distinct, non-overlapping modules, one for content-based and the other for speaker-based retrieval. The two modules can be programmed to run concurrently using threads or processes since they are completely independent. In the illustrative implementation both modules run sequentially.

At retrieval time, the content and speaker audio retrieval system 600 loads the same vocabularies, tag dictionaries, morphological tables and token tables that were used in indexing during steps 610 and 20. The appropriate content index file(s) 200 and speaker index file(s) 300 are loaded into memory during step 620. A test is performed during step 625 until a query is received.

The query string is received and processed during step 630. In response to a received textual query, the query string is compared during step 635 against the content index file(s) 200 to compute the most relevant document(s) using an objective ranking function (ranked document score). The ranked document score that is used in the ranking of these documents is also recorded for subsequent computing of the combined scores in accordance with the present invention (step 645).

The following version of the Okapi formula, for computing the ranked document score between a document d and a query q is used:

$$S(d, q) = \sum_{k=1}^{Q} c_q(q_k) \frac{c_d(q_k)}{\alpha_1 + \alpha_2 \frac{l_d}{l} + c_d(q_k)} idf(q_k)$$

Here, $q_k$ is the $k^{th}$ term in the query, Q is the number of terms in the query, $c_q(q_k)$ and $c_d(q_k)$ are the counts of the $k^{th}$ term in the query and document respectively, $l_d$ is the length of the document, l is the average length of the documents in the collection, and $idf(q_k)$ is the inverse document frequency for the term $q_k$ which is given by:

$$idf(q_k) = \log\left(\frac{N - n(q_k) + 0.5}{n(q_k) + 0.5}\right),$$

where N is the total number of documents and $n(q_k)$ is the number of documents that contain the term $q_k$. The inverse document frequency term thus favors terms that are rare among documents. (For unigrams, $\alpha_1=0.5$ and $\alpha_2=1.5$). Clearly, the idf can be pre-calculated and stored as can most of the elements of the scoring function above except for the items relating to the query.

Each query is matched against all the documents in the collection and the documents are ranked according to the computed score from the Okapi formula indicated above. The ranked document score takes into account the number of times each query term occurs in the document normalized with respect to the length of the document. This normalization removes bias that generally favor longer documents since longer documents are more likely to have more instances of any given word. This function also favors terms that are specific to a document and rare across other documents. (If a second pass is used, the documents would be re-ranked by training another model for documents, using the top-ranked documents from the first pass as training data.)

Thereafter, the identified documents (or a subset thereof) are analyzed during step 640 to determine if the speaker identified in the speaker index file(s) 300 matches the speaker specified by the user in the query. Specifically, the time bounds of the ranked documents satisfying the content-based query are compared with those documents satisfying the speaker-based query to identify documents with overlapping start and end times. A single segment from speaker retrieval may overlap with multiple segments from text retrieval.

The combined score for any overlapping documents is computed during step 645 as follows:

combined score=(ranked document score+(lambda*speaker segment score))*overlap factor in the manner described above. All of the scored documents are then ranked and normalized with the most relevant document getting a match-score of 100.

Generally, the top N documents alone are returned to the user. Thus, a list of start and end times of the N best-matched segments, together with the match-scores, and the matched words that contributed to the relevance score are returned during step 650. The default start time of each combined result is the same as the start time for the corresponding document from the content-based search. (The other choice is to use the start time of the speaker segment.) The end time is set to the end of the speaker segment (simply to let the speaker finish his statement). However, for usability reasons, the segment can be truncated at a fixed duration, such as 60 seconds, i.e., two times as long as the average document length.

USER INTERFACE

The illustrative user interface is capable of showing all the relevant information for each of the N selections returned by the retrieval engine, and on further selection uses a media handler component, implemented using the Java Media Filter, to display MPEG-1 video via a VCR-like interface. The Java application is responsible for locating the video files (which can be on a server if the PC is networked), and then uses information gathered during retrieval to embellish the results, such as displaying the retrieved document, associated information such as media file name, start time, end time, rank, normalized score, a graphic view of where in the media file the retrieved segment lies, highlighting the query words (and other morphs that contributed to the ranking of that document)—this is relevant only for content-based searching, or permitting highlighting of portion of the displayed retrieved document for play back.

The top N retrieved items are presented to the user in a compact form. This lets the user visually review the retrieved item for further action. Generally, it includes all the gathered information about the retrieved document including a portion of the text of the document. When one of the retrieved items is selected for perusal of the audio or video, the media handler component is called upon to locate the media file, advance to the specified start time, decompress the stream (if required), and then initialize the media player with the first frame of the audio or video. The VCR-like interface permits the user to "play" the retrieved video from start to finish or to stop and advance at any juncture.

Further improvements can be made within the context of our approach to content-based information retrieval from audio. The current set of documents derived from the speech recognition output can be augmented by including the next-best guesses for each word or phrase from the recognizer. This information can be used for weighting the index terms, query expansion, and retrieval. Also, better recognition accuracy can be had by detecting segments with music or mostly noise that only pure speech is indexed for retrieval. One limitation with the current approach to audio-indexing is the finite coverage of the vocabulary used in the speech recognizer. Words such as proper nouns and abbreviations that are important from an information retrieval standpoint are often found missing in the vocabulary and hence in the recognized transcripts. One method to overcome this limitation is to complement the speech recognizer with a wordspotter for the out of vocabulary words. For this approach to be practical, however, one has to have the ability to detect spoken words in large amounts of speech at speeds many times faster than real-time.

It is to be understood that the embodiments and variations shown and described herein are merely illustrative of the principles of this invention and that various modifications may be implemented by those skilled in the art without departing from the scope and spirit of the invention.

What is claimed is:

1. A method for retrieving audio information from one or more audio sources, said method comprising the steps of:
   receiving a user query specifying at least one content and one speaker constraint; and
   comparing said user query with a content index and a speaker index of said audio source to identify audio information satisfying said user query.

2. The method of claim 1, wherein said content index and said speaker index are time-stamped and said comparing step further comprises the step of comparing the start and end times of the document segments in both the content and speaker domains.

3. The method of claim 1, wherein said content index includes the frequency of each word in said audio source.

4. The method of claim 1, wherein said content index includes the inverse document frequency (IDF) of each word in said audio source.

5. The method of claim 1, wherein said content index includes the length of said audio source.

6. The method of claim 1, wherein said content index includes a set of chain linked pointers to each document containing a given word.

7. The method of claim 1, wherein said speaker index includes a score indicating the distance from an enrolled speaker model to the audio test segment.

8. The method of claim 1, wherein said speaker index includes the start and end times of each audio segment.

9. The method of claim 1, wherein said speaker index includes a label identifying the speaker associated with the segment.

10. The method of claim 1, wherein said comparing step further comprises the step of comparing documents satisfying the content-based query with documents satisfying the speaker-based query to identify relevant documents.

11. The method of claim 1, further comprising the step of transcribing and indexing said audio source to create said content index and said speaker index.

12. The method of claim 11, wherein said step of creating said speaker index comprises the steps of automatically detecting turns in said audio source and assigning a speaker label to each of said turns.

13. The method of claim 1, further comprising the step of returning at least a portion of said identified audio information to a user.

14. The method of claim 1, further comprising the step of assigning a combined score to each segment of said identified audio information and returning at least a portion of said identified audio information in a ranked-list.

15. The method of claim 14, wherein said combined score evaluates the extent of the overlap between the content and speaker domains.

16. The method of claim 14, wherein said combined score evaluates a ranked document score ranking the content-based information retrieval.

17. The method of claim 14, wherein said combined score evaluates a speaker segment score measuring the proximity between a speaker segment and enrolled speaker information.

18. The method of claim 1, wherein said speaker constraint includes the identity of a speaker.

19. The method of claim 1, wherein said content constraint includes one or more keywords.

20. An audio retrieval system for retrieving audio information from one or more audio sources, comprising:
   a memory that stores a content index and a speaker index of said audio source and computer-readable code; and
   a processor operatively coupled to said memory, said processor configured to implement said computer-readable code, said computer-readable code configured to:
      receive a user query specifying one or more words and the identity of a speaker; and
      combine the results of a content-based and a speaker-based audio information retrieval to provide references to said audio source based on the audio content and the speaker identity.

21. The audio retrieval system of claim 20, wherein said content index and said speaker index are time-stamped and said processor is further configured to compare the start and end times of the document segments in both the content and speaker domains.

22. The audio retrieval system of claim 20, wherein said content index includes the frequency of each word in said audio source.

23. The audio retrieval system of claim 20, wherein said content index includes the inverse document frequency (IDF) of each word in said audio source.

24. The audio retrieval system of claim 20, wherein said speaker index includes a score indicating the distance from an enrolled speaker model to the audio test segment.

25. The audio retrieval system of claim 20, wherein said speaker index includes a label identifying the speaker associated with the segment.

26. The audio retrieval system of claim 20, wherein said processor is further configured to compare documents satisfying the content-based query with documents satisfying the speaker-based query to identify relevant documents.

27. The audio retrieval system of claim 20, wherein said processor is further configured to transcribe and index said audio source to create said content index and said speaker index.

28. The audio retrieval system of claim 20, wherein said processor is further configured to assign a combined score to each segment of said identified audio information and return at least a portion of said identified audio information in a ranked-list.

29. The audio retrieval system of claim 28, wherein said combined score evaluates the extent of the overlap between the content and speaker domains.

30. The audio retrieval system of claim 29, wherein said combined score evaluates a ranked document score ranking the content-based information retrieval.

31. The audio retrieval system of claim 29, wherein said combined score evaluates a speaker segment score measuring the proximity between a speaker segment and enrolled speaker information.

32. An article of manufacture for retrieving audio information from one or more audio sources, comprising:
- a computer readable medium having computer readable program code means embodied thereon, said computer readable program code means comprising:
- a step to receive a user query specifying one or more words and the identity of a speaker; and
- a step to combine the results of a content-based and a speaker-based audio information retrieval to provide references to said audio source based on the audio content and the speaker identity.

33. An article of manufacture for retrieving audio information from one or more audio sources, comprising:
- a computer readable medium having computer readable program code means embodied thereon, said computer readable program code means comprising:
- a step to receive a user query specifying at least one content and one speaker constraint; and
- a step to compare said user query with a content index and a speaker index of said audio source to identify audio information satisfying said user query.

* * * * *

UNITED STATES PATENT AND TRADEMARK OFFICE
CERTIFICATE OF CORRECTION

PATENT NO. : 6,345,252 B1
DATED : February 5, 2002
INVENTOR(S) : Beigi et al.

It is certified that error appears in the above-identified patent and that said Letters Patent is hereby corrected as shown below:

Title page,
Item [56], References Cited, U.S. PATENT DOCUMENTS, insert the following reference:
-- 5,659,662    8/19/97    Wilcox et al. --.

Column 9,
Line 9, replace "following rule"" with -- following rule: --.
Line 47, before "Proc." and after "Recognition," delete """.
Line 48, replace "ICASSP98}" with -- ICASSP98 --.

Column 10,
Lines 20-21, replace "$d_{i,n} = -\log\left[\sum_{j=1}^{n_i} p_{i,j} p(f_n | \overrightarrow{j^{th} \text{ component of } M_i})\right]$" with
-- $d_{i,n} = -\log[\sum_{j-1}^{n_i} p_{i,j} p(f_n | \overrightarrow{j^{th} \text{ component of } M_i})]$ --.

Signed and Sealed this

Eighteenth Day of October, 2005

JON W. DUDAS
*Director of the United States Patent and Trademark Office*